United States Patent [19]
Penisson

[11] Patent Number: 5,535,645
[45] Date of Patent: Jul. 16, 1996

[54] POWER TONG WITH IMPROVED GUARD AND METHOD

[75] Inventor: Dennis J. Penisson, Raceland, La.

[73] Assignee: Bilco Tools, Inc., Houma, La.

[21] Appl. No.: 226,640

[22] Filed: Apr. 12, 1994

[51] Int. Cl.[6] .................................................. B25B 13/50
[52] U.S. Cl. ............................. 81/57.33; 81/57.15
[58] Field of Search ............................. 81/57.33, 57.34, 81/57.14–57.21

[56] References Cited

U.S. PATENT DOCUMENTS

| | | |
|---|---|---|
| 1,774,752 | 9/1930 | King . |
| 2,639,894 | 5/1953 | Smith . |
| 2,846,909 | 8/1958 | Mason . |
| 2,862,690 | 12/1958 | Mason . |
| 2,933,961 | 4/1960 | Adams . |
| 3,141,362 | 7/1964 | Tammy et al. ............... 81/57.16 |
| 3,709,072 | 1/1973 | Rogers . |
| 3,799,010 | 3/1974 | Guier . |
| 4,170,907 | 10/1979 | Cathcart . |
| 4,266,450 | 5/1981 | Farr et al. . |
| 4,357,843 | 11/1982 | Peck et al. . |
| 4,371,069 | 2/1983 | Lovegrove . |
| 4,436,002 | 3/1984 | Kennington et al. . |
| 4,442,736 | 4/1984 | True et al. . |
| 4,593,584 | 6/1986 | Neves ....................... 81/57.18 |
| 4,776,243 | 10/1988 | Schulze-Beckinghausen et al. . |
| 5,150,642 | 9/1992 | Moody et al. . |

Primary Examiner—D. S. Meislin
Attorney, Agent, or Firm—Browning, Bushman, Anderson & Brookhart

[57] ABSTRACT

A method and apparatus for an open throat power tong is provided to cover the rotary region of the power tong, including the pipe slot, wherein numerous moving parts may cause injury due to accidentally misplaced fingers or hands. Top and bottom movable guard portions, movable between open and closed positions, operate in conjunction with top and bottom fixed guard portions to cover the rotary region. When the movable guard portions are in the open position, hydraulic oil flow to a hydraulic power tong motor is completely blocked rather than diverted so as to avoid slow creep of the motor. Sensors that detect the open and closed position of the guards are placed in series so that all sensors must be shifted to allow tong motor operation. The movable guard portions may be pivotally mounted to a rear segment of the fixed guard portion.

24 Claims, 4 Drawing Sheets

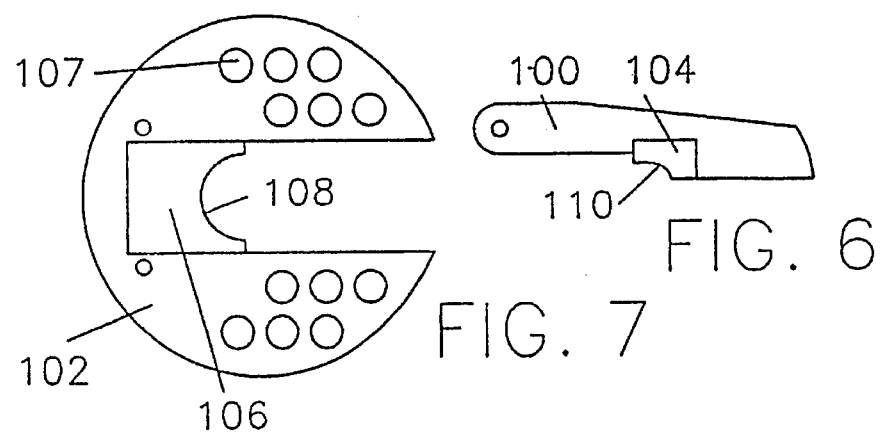
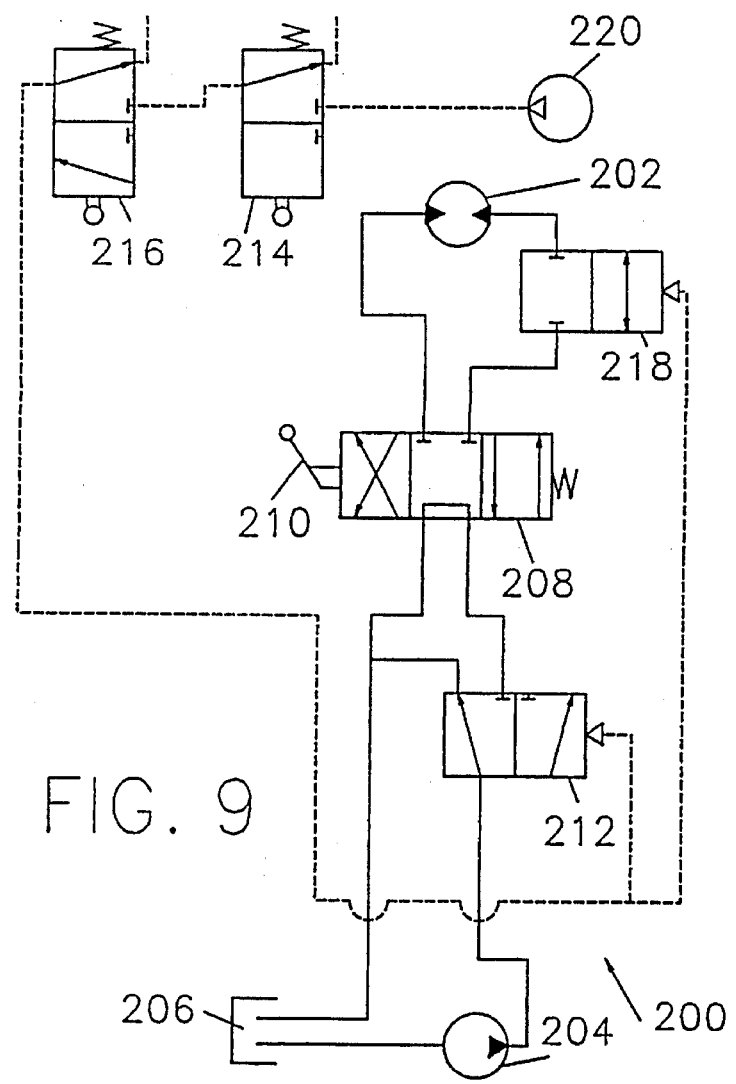

5,535,645

POWER TONG WITH IMPROVED GUARD AND METHOD

FIELD OF THE INVENTION

The present invention relates generally to a power tong of the type used to make-up and break-apart an oilfield tubular connection. More particularly, this invention relates to an improved open-throat power tong with a movable slot guard for co-operating with a fixed cage plate guard.

BACKGROUND OF THE INVENTION

Power tongs have been used extensively in the oil industry for many years to speed the process of making-up and breaking-apart connections between oilfield tubular goods during drilling and work-over operations. Such power tongs typically include a rotary mechanism for gripping the external surface of one threaded member, and then rotating that member to make or break the threaded connections. In some cases, a back-up tong is used to ensure that the lower threaded member remains stationary when the upper threaded member is rotated by the power tong.

A power tong may be of the closed throat type, wherein a 360° rotatable ring is positioned about the connection, or the open throat type, wherein the rotatable ring includes a slot or throat. A closed throat tong ring is inherently structurally preferred, but the open throat ring desirably allows the tong to be laterally moved on or taken off a tubular connection. The present invention is primarily directed to an open throat power tong. Open-throat power tongs typically are repeatedly moved laterally on then off a pipe string each time a threaded connection is made up or broken out.

An open throat or partial rotary drive ring may typically be mounted with guide rollers for rotation with respect to the power tong frame about a rotation axis which extends through the power tong throughbore. The rotary drive ring may typically define camming surfaces on an interior surface of the rotary drive ring. A cage plate assembly is mounted for rotation with the rotary drive gear. One or more heads carried by the cage plate thus grasp the pipe upon relative motion between the cage plate assembly and one or more camming surfaces provided on the rotary drive ring. Once the cage plate assembly is in gripping engagement with the pipe, the drive ring is then rotated to simultaneously rotate the cage plate assembly and thus the pipe for the threading or unthreading operation.

Each year numerous power-tong related accidents are reported, typically involving injured fingers and hands. The large number of moving parts in the power tong operate with a torque that is practically impervious to an accidentally misplaced finger or hand. Even when the tong is in "neutral" and the gears slowly creep due to circulating hydraulic fluid, the forces are generally sufficient to sever a misplaced finger.

The hazardous nature of power tong operation is a problem that has long been recognized by the industry although satisfactory solutions have not been devised to significantly reduce or eliminate this condition. In an attempt to solve these problems, power tongs have been designed so that the operator must have both hands on control levers before the tong operates, however this solution does not protect those persons who must continually open and close the tongs so that they can be laterally moved on and off the tubular goods. Also, such dual lever concepts can be by passed, e.g., by two operators each having one hand on one control, or by mechanically interlocking the two levers. Various power tong designs have partial guards that provide protection with respect to some of the power tong's moving parts. However, presently available open throat power tongs do not provide shielding for all or substantially all of the tong moving parts. The problems associated with adequate tong shielding include recognition that the power tong practically must be able to operate on different diameter tubulars. Also, existing power tongs do not contain adequate safeguards to ensure that safely devices are properly in place prior to actuating the tong, and the hydraulic circuits used to drive the power tongs allow for high force movement of tong components even when no such movement is desired by the setting of the operator controls.

Thus, there has been a long felt need in the industry to provide an improved power tong designed to significantly reduce accidents while retaining efficient operation, that is adaptable to presently existing tongs, and that has a reasonable cost. Those persons skilled in the art will appreciate the present invention which provides solutions to these and other problems associated with power tongs.

SUMMARY OF THE INVENTION

The present invention relates to an open throat powered tong for making and breaking connections between threaded members. The tong comprises a power tong frame having a throughbore for receiving the threaded members. Top and bottom rotary plates of the power tong cage plate assembly are rotatable with respect to the power tong frame. The top and bottom rotary plates and the partial ring each define a slot region for laterally moving the tong on and off the threaded members, i.e., to and from the throughbore in the tong frame. A tong motor operates to drive the top and bottom rotary plates and the partial, ring during the making and breaking of the connections.

A top guard is movable between an open and a closed position with respect to the power tong frame. While in the closed position, the top movable guard encloses substantially all of the pipe slot region in the top rotary plate, with the exception of the throughbore that remains exposed. The top guard is operative while in the closed position to remain fixed with respect to the power tong frame during the making and breaking of the threaded members. The top movable guard exposes top pipe slot region while in the open position to allow the tong to be laterally moved on and off the threaded members. Means, either automatic or manual, are provided for moving the top guard between the open and closed positions.

A top fixed guard is secured to the power tong frame and substantially encloses the top rotary tong plate. The top fixed guard has a front portion with an opening therein corresponding to the slot region and a rear portion opposite the throughbore from the pipe slot. The top fixed guard operates to remain fixed with respect to the power tong frame while the tong is moved on and off the threaded members and while making and breaking the threaded connections.

In operation, the rotary components of the power tong, with the exception of the throughbore in the powered tong, are enclosed or shielded by the tong frame and the guards. The tong nevertheless can be easily moved laterally on and off the vertically disposed threaded members. The rotary tong components not already covered by the top fixed guard are covered by the movable guard, while leaving an opening in the throughbore of the tong for receiving the vertically disposed member.

The completion of the step of covering is sensed by a sensor that produces a signal when the guards are properly in place. The operation of the power tong motor is inhibited until the signal is produced.

An object of the present invention is a power tong with improved safety.

Another object of the present invention is an open throat power tong which allows for the tong to be laterally moved on and off the threaded members while covering moving parts of the power tong during the make-up and break-out of the connections.

Another object of the present invention is a tong guard that may be lightweight, is easy to operate, and is adaptable to existing power tongs of virtually all sizes.

A feature of the present invention is a flexible insert attachable to the fixed or movable guards that flexes in response to engagement with the threaded members.

A further feature of a preferred embodiment of the invention is a hydraulic system that includes means to prevent operation of the power tong motor until all guards are in position.

Yet another feature of present invention is a split movable guard having two components each pivotally attached to the fixed tong frame.

An advantage of the present invention is the economical construction of safety devices that are relatively simple yet reliable.

These and other objects, features, and advantages of the present invention will become apparent from the drawings, the descriptions given herein, and the appended claims.

BRIEF DESCRIPTION OF THE DRAWINGS

FIG. 6 is a top view of an insert for a moveable power tong guard according to the present invention;

FIG. 7 is a top view of an insert for a fixed power tong guard according to the present invention;

FIG. 9 is a hydraulic schematic diagram of a power tong in accord with the present invention.

While the present invention will be described in connection with presently preferred embodiments, it will be understood that it is not intended to limit the invention to those embodiments. On the contrary, it is intended to cover all alternatives, modifications, and equivalents included within the spirit of the invention.

DETAILED DESCRIPTION OF THE PREFERRED EMBODIMENTS

Figure 1:
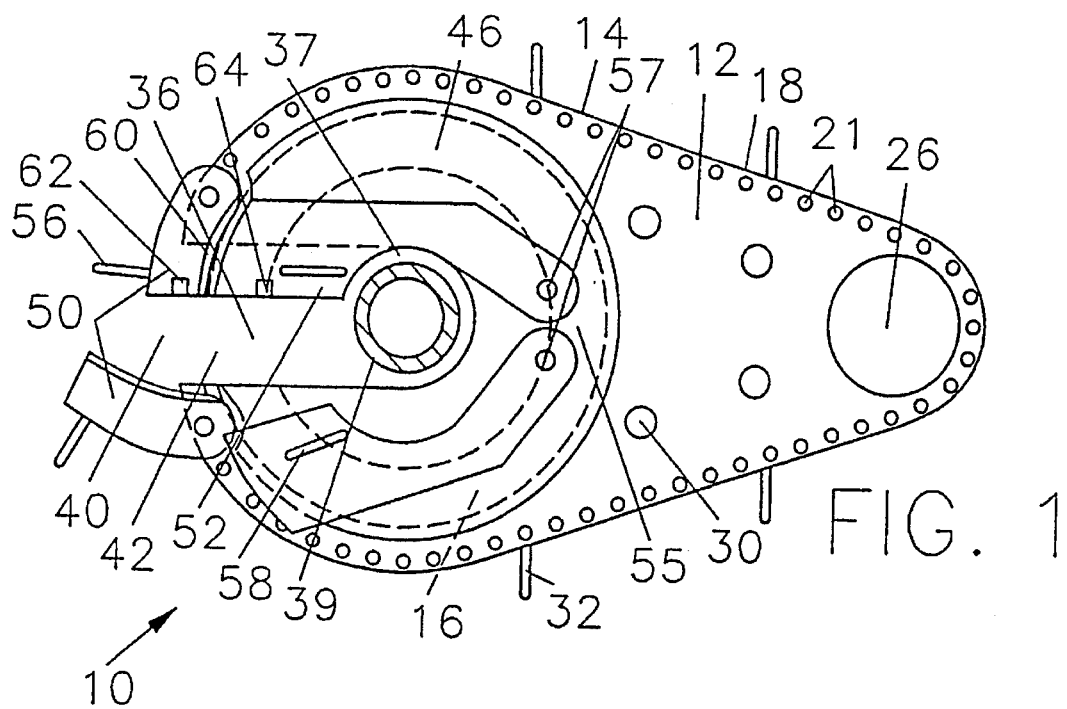
FIG. 1 is a top view, of a power tong in accord with the present invention.

Referring now to the drawings, and more particularly to FIG. 1, there is schematically shown a power tong, generally designated 10, in accord with the present invention. Power tong 10 has a power tong frame 12 which houses a rotary drive ring or partial drive ring 16. Frame 12 includes upper 18 and lower 20 plates that may be secured to a housing by rivets or bolts 21. The front or rotary portion 14 of frame 12 includes upper 22 and lower 24 plates (which structurally may be integral with plates 18 and 20) through which movable parts, generally rotatable, are accessible. Schematically indicated hydraulic motor 26 drives gears, such as gear 28, held in position by bearing mount 30 to rotatably actuate rotary gear 16.

In normal use, power tong 10 is typically suspended so as to be substantially horizontal and may be suspended by chains from chain loops 32 or by other means to maintain power tong 10 in a horizontal position. Pipe tong 10 typically moves laterally to direct vertically oriented threaded pipe 34 through pipe slot 36 to throughbore 37, where the pipe is rotated to make up or break out a threaded connection 39 between schematically shown pipes 34 and 35. Top and bottom rotary cage plates 23 and 25, respectively, surround throughbore 37 and typically are mounted for rotation in response to rotation of partial drive ring 16. Top and bottom rotary cage plates 23 and 25 further define a pipe slot 36 therein.

Pipe slot 36 has a radially outwardly end 40, a top opening 42, and a bottom opening 44. The general configuration of power tongs and the numerous moving parts thereon are well known to those skilled in the art. See, for instance, U.S. Pat. No. 5,150,642 which discloses a typical power tong with gripping jaws, partial rotary ring, cage plate assembly, drive gears, and other components and is hereby incorporated herein by reference.

Figure 2:
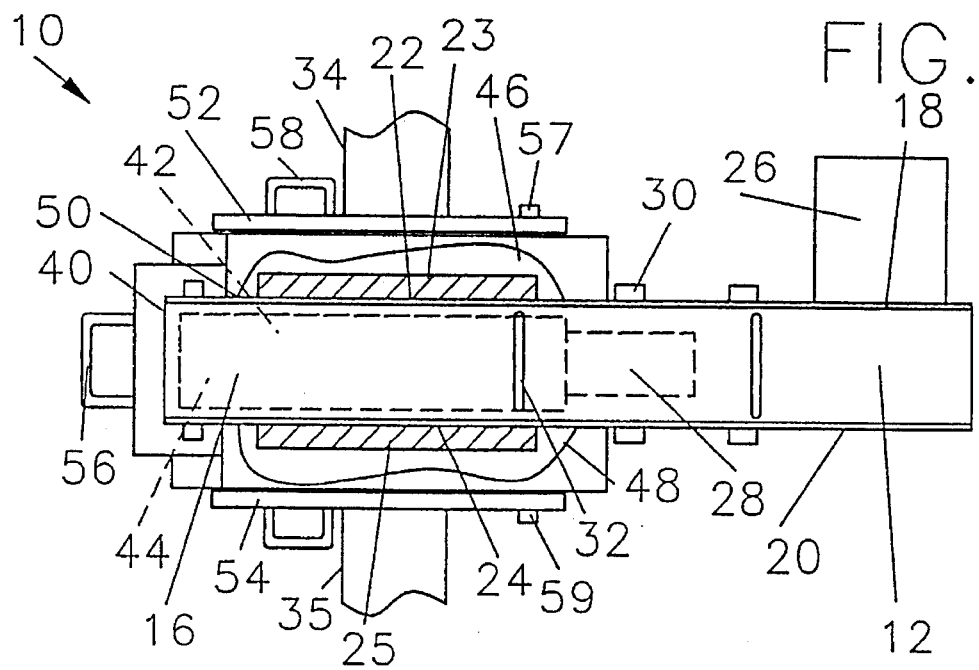
FIG. 2 is a side elevational view of the power tong shown in FIG. 1.

Power tong 10 includes upper and lower fixed guards 46 and 48 that, in a preferred embodiment, cooperate with the tong frame 12 to enclose cage plates 23 and 25 except for slot 36 and throughbore 37. Power tong 10, in one embodiment of the present invention shown in FIG. 1 and 2, includes doors, such as doors 50 that essentially cover radially outwardly end 40 of slot 36. In the preferred embodiment of FIG. 1 and 2, pivotal guard pairs 52 and 54 cover the top opening 42 and the bottom opening 44, respectively, of the pipe slot 36. Opening mechanisms for doors 50 or pivotal guard pairs 52 and 54, may be automatic or manual, or selectable between automatic and manual. Handles 56 and 58 may be used for manual operation. Handles 58 for upper and lower pivotal guard pairs 52 and 54 may interconnect with each other so that upper and lower guard pairs 52 and 54 are opened and closed simultaneously. The guard pair 52 and 54 could also interconnect with door handles 56 so that opening/closing doors 50 also opens/closes the pivotal guard pairs 52 and 54.

Each pivotal guard is preferably substantially J-shaped, as shown in FIG. 1, having a curved portion to wrap around throughbore 37 without covering throughbore 37. The pivots 57 and 59, for top 52 and bottom 54 pivotal guard pairs, respectively, are preferably disposed on a rear portion 55 of fixed guards 46 and 48, respectively, namely opposite the throughbore 37 from pipe slot 36. One advantage of this pivot positioning and the J-shaped configuration is that the pivotal guards do not necessarily need to extend outwardly of tong frame 12 in the open position, where they may inadvertently cause an injury. Another advantage is that the guard is conveniently operable and may be opened and closed in much the same way as standard tong doors 50 are opened and closed. Thus, the pivotal guards co-operate with the fixed guards since the fixed guards also provide a convenient pivot point at 57 and 59 for the pivoted guards.

An additional covering 60 may be mounted to door 50 adjacent top pivotal guard pair 52 for covering any opening therebetween. (See also FIG. 8 where pivotal guard mounts to door.) The material for this additional covering, or for other guard components as discussed hereinafter, may be a rigid material, such as metal, or may be a flexible material, such as elastomer.

Sensors, such as sensor 62 and sensor 64, are preferably used to sense when doors 50 and guard pairs 52 and 54 are in the open and closed positions. Operation of hydraulic motor 26 is then inhibited until all doors and guards are closed in accord with a control system, such as the hydraulic/air control system shown in FIG. 9.

Figure 3:
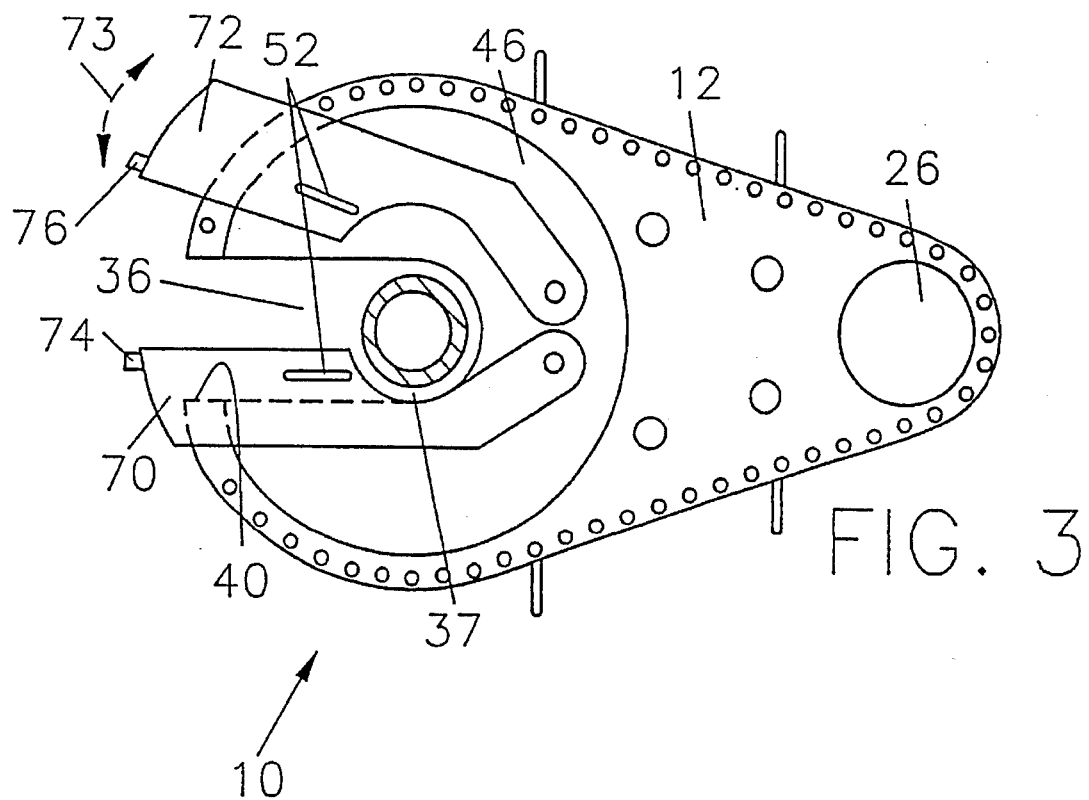
FIG. 3 is a top view of a power tong illustrating a movable guard in the open position and a movable guard in the closed position.

FIG. 3 discloses an alternative embodiment that does not include additional doors 50. Instead, pivotal guards 70 and 72 cover the entire pipe slot 36, including the radially outwardly end 40. As before, the pivotal guards move pivotally, as indicated by arrow 73 for pivotal guard 72, to cover and uncover pipe slot 36. A bottom pivotal guard pair (see FIG. 2) is preferably used to cover bottom opening 44 of pipe slot 36. Sensors 74 and 76 are used to indicate when guards 70 and 72 are closed, and thereby prevent operation of hydraulic motor 26 until the pivotal guards are properly positioned. The configuration of the guards as shown in FIG. 3 may be especially useful for open throat tongs that do not normally have doors. In some cases, it may be desirable that pivotal guards 70 and 72 latch together for providing a pivotal guard function of covering pipe slot 36.

Figure 5:
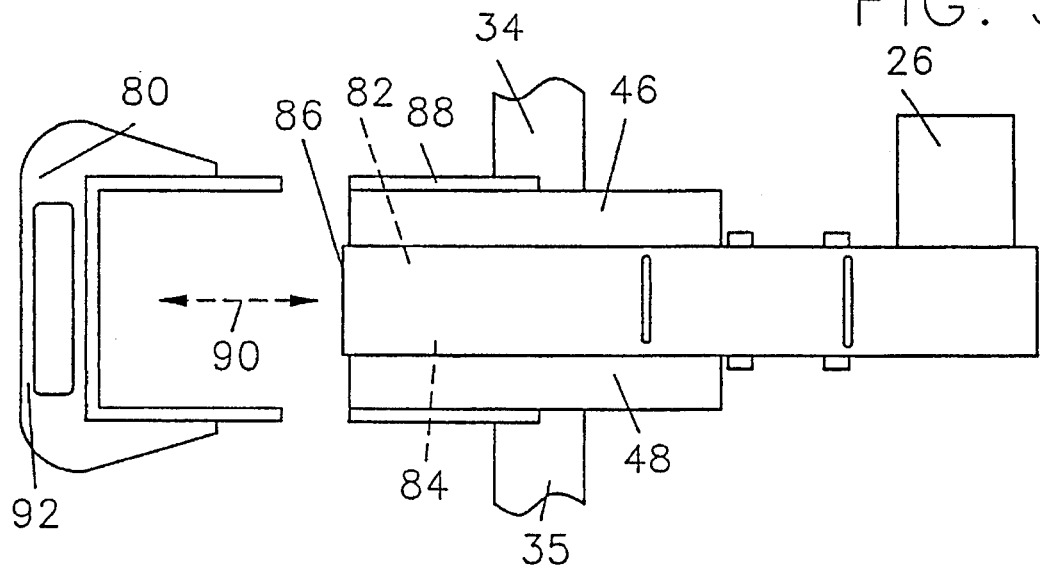
FIG. 5 is a side elevational view of the power tong shown in FIG. 4.
Figure 4:
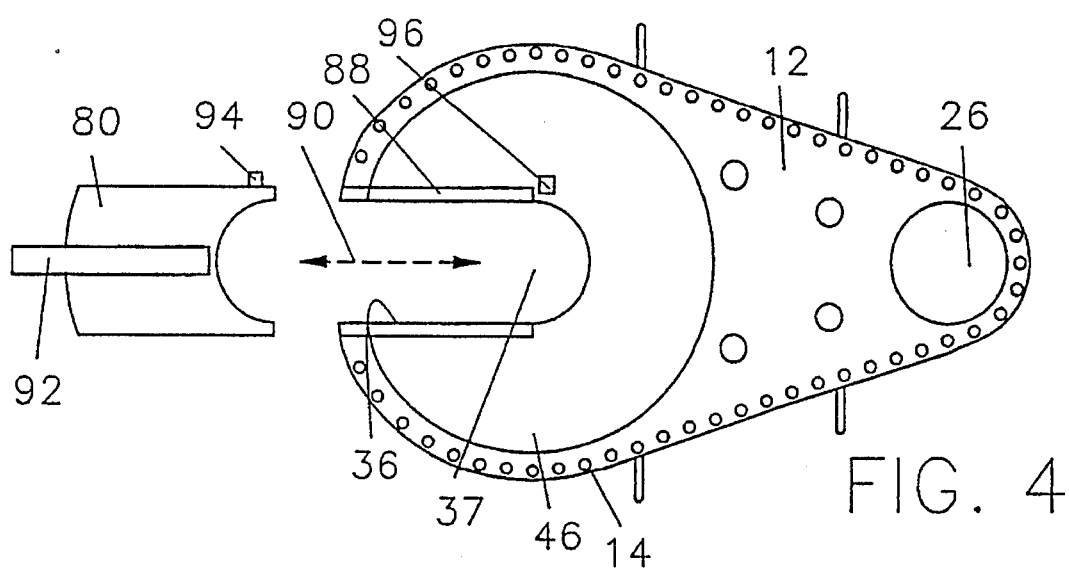
FIG. 4 is a top view of a power tong illustrating a sliding slot guard positioned exterior of the long frame.

FIG. 4 and FIG. 5 disclose another embodiment that provides a guard configuration that may be more suitable for smaller tongs which may pose mounting problems for the pivotal guards described above. In this case, a single sliding guard 80 covers all of pipe slot 36 including top opening 82, bottom opening 84, and radially outwardly end 86. For this purpose, guard 80 is substantially U-shaped, as seen from the side in FIG. 5. Sliding guard 80 may slide along rails, such as rail 88, radially inward and outward toward and away from throughbore 37, as indicated by arrows 90. Handle 92 may be used for manually positioning the sliding guard 80 into engagement with fixed guards 46 and 48. Sensors 94 and 96 may detect the relative position of sliding guard 80 with respect to the fixed guards, such as top fixed guard 46, to inhibit operation of hydraulic motor 26 until the rotary cage plates and the partial ring are fully covered.

FIG. 6 and FIG. 7 show another embodiment of the present invention wherein moving guard 100 and fixed guard 102 each include corresponding removable inserts 104 and 106, respectively. Inserts 104 and 106 are used to adjust the size and/or configuration of the guards, as along curvatures 108 and 110, to correspond to the size of the pipe to be rotated within the power tong. By changing inserts, the same fixed and movable guard portions may be used with a wide variety of pipe sizes. The insert material may be a plastic, elastomeric, or otherwise flexible or resilient member so as to absorb shock against the pipe. If made of flexible material, then the guards may be sized to make contact with the pipe. If made of metal, then it may be desirable for the guards to be offset somewhat from the pipe as discussed further hereinafter. The guards themselves are preferably metallic, but may be perforated over a portion or over the entire guard, with perforations such as 107, so as to reduce their weight while still retaining sufficient strength to perform their guard function. The guards or a portion of the guards may also be made of flexible/resilient material, a plastic lightweight material, and/or combinations thereof.

Figure 8:
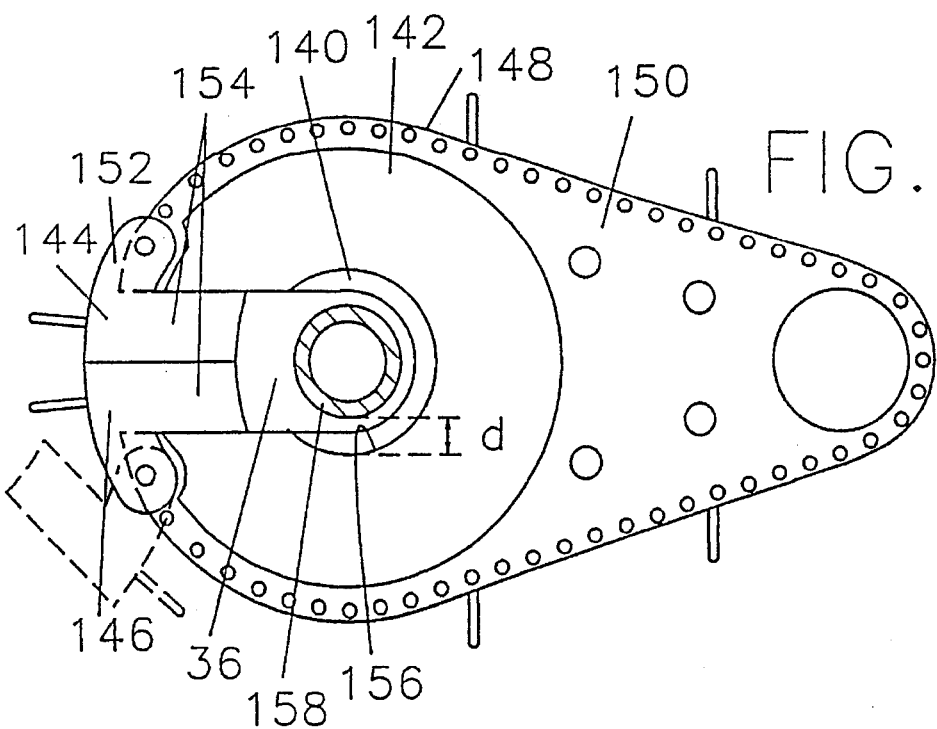
FIG. 8 is a top view of a power tong with movable slot guards attached to tong doors.

FIG. 8 discloses another embodiment guard configuration that may be more suitable for a large tong, wherein the center portion of the partial rotary ring 140 is uncovered or exposed, but is also out of normal reach for any operation positioned on the side of the tong. In this embodiment, fixed guard 142 works with combination gate-guards 144 and 146 to cover all areas of rotary portion 148 of frame 150 except the centermost region. Each gate-guard 144 and 146, respectively, has a gate portion 152 for covering the outwardly portion of pipe slot 36 and a guard portion 154 for covering the radially inward upper or lower portion of pipe slot 36. Each gate-guard 144 and 146 may be bolted or otherwise secured to a respective hinged door to move with the hinged door between an open and a closed position. The open position of gate-guard 146 is indicated in FIG. 8 by dashed lines. The guard portions 154 are slidable with respect to each other to allow easy opening and closing of doors 144 and 146. For this purpose, it will be clear that portions 154 are at different vertical levels so as to allow them to be slidable with respect to each other. The movable guards disclosed herein have a vertical hinge axis. It should be understood that the movable guards could have a substantially horizonal hinge axis, and that this design might be preferred for some types of power tongs.

Thus, the inner circumference 156 of fixed guard 142 is disposed a distance "d" from the outer circumference of pipe 158. With very large tongs, this distance "d" may be up to three or more inches. For small tongs, the optimal distance "d" is less than about one-half inch. If the guards contain resilient or flexible portions, such as flexible inserts, then the distance "d" may preferably be zero inches, with the inserts being designed to contact the pipe 158.

Referring now to the hydraulic schematic shown in FIG. 9, a preferred embodiment of a hydraulic control system according to the present invention is disclosed. The movable guards, discussed hereinbefore, are preferably connected to power tong hydraulic system 200 in a manner which prevents the tong from rotating until the movable guards are in the closed position. One feature of the preferred hydraulic system provides that hydraulic oil flow to motor 202 from hydraulic pump 204 be completely blocked, not just diverted. In the prior art systems where the hydraulic oil is only diverted, the tong may still rotate slowly, even though the four-way value of the tong for controlling fluid flow is in neutral. Without completely blocking the hydraulic oil flow, the tong partial ring may rotate even when the movable safety guards are not properly positioned. It should be noted that because the sensors may be positioned on the fixed guard adjacent the movable guards, the sensors may typically actually require adjustment of the fixed and/or the movable guards prior to operation of the power tong motor.

In the hydraulic schematic of FIG. 9, hydraulic pump 204 supplies oil to system 100 from hydraulic tank 206. Hydraulic motor 202 powers the tong typically by rotating a drive gear, such as partial ring 16. Four-way valve 208 controls stopping, forward, and reverse of tong motor 202 via control handle 210. Three-way valve 212 blocks the flow of oil to hydraulic motor 202 and directs oil back to hydraulic tank 206 in response to sensors 214 and 216 when the guards are in the open position. When all the guards are moved to the closed position, three-way valve 212 allows oil to flow to four-way valve 208, thereby permitting the operator to control the power tong. Two-way valve 218 provides an alternative/additional means to control hydraulic oil flow to motor 202 in response to sensor 214 and 216. Thus, in response to sensors 214 and 216, two-way valve 218 either passes or blocks flow to hydraulic motor 202.

Sensors 214 and 216 are preferably pilot sensors placed in series so that both sensors must shift, when the guards are in place, to allow motor 202 operation. The sensors may be of various types, such as electric, fibre optic, or oil or air operated sensors. While two sensors are shown, it will be understood that one sensor or more than two sensors could also be used with this system.

In operation of power tong 10 according to the present invention, movable guards, preferably configured as discussed hereinbefore, are moved to an open position to allow threaded members to be moved though the pipe slot to the throughbore. While the movable guards are in the open position, the motor that drives the tong is inoperative. The movable guards are then closed, along with any tong gates, and sensors to detect the position of the guards now allow operation of the tong. Only after the tong is properly positioned with respect to the pipe and the pipe slot is covered to prevent accidental positioning of a hand or finger, may the tong be operated. Thus, use of the present invention, is anticipated to greatly reduce the number of injuries.

The foregoing detailed disclosure and description of the invention is illustrative and explanatory thereof. Additional features may be added or varied. For instance, padded materials may be used on mating sides of movable guards where the movable guards engage the pipe, each other, or engage the fixed guards. Such padded materials avoid pinching of fingers while opening and closing the movable guards. Thus, it will be appreciated by those skilled in the art, that various changes in the size, shape and materials as well as in the details of the illustrated construction, reliability configurations, or combinations of features of the various elements of the present invention may be made without departing from the spirit of the invention.

What is claimed is:

1. A power tong for making and breaking connections between oilfield threaded members, comprising:

a power tong frame having a throughbore for receiving the threaded members;

a partial ring substantially surrounding the throughbore and rotatable within the power tong frame;

top and bottom rotary plates each substantially surrounding the throughbore and rotatable with respect to the power tong frame in response to rotation of the partial ring, the top and bottom rotary plates defining respective top and bottom pipe slot openings for laterally moving the power tong on and off the threaded members;

a tong motor operable for driving the partial ring during the making and breaking of the connections;

a top fixed guard secured to the power tong frame, the top fixed guard substantially enclosing the top rotary plate and having a front portion with an opening therein corresponding to the top pipe slot opening and a rear portion opposite the throughbore from the front portion, the top fixed guard being fixed with respect to the power tong frame while the tong is moved on and off the threaded members and while making and breaking the threaded connections; and a top movable guard movable with respect to the power tong frame between an open and a closed position, the top movable guard enclosing substantially all of the top pipe slot opening while in the closed position and exposing the top pipe slot opening while in the open position for moving the tong laterally on and off the threaded members, the top movable guard being pivotally mounted to the power tong frame with a pivot connection positioned opposite the top pipe slot opening with respect to the throughbore in the power tong frame.

2. The power tong of claim 1, wherein:
   the top movable guard is supported on the top fixed guard.

3. The power tong of claim 1, wherein the top movable guard further comprises:
   first and second portions each separately movable with respect to the power tong frame.

4. The power tong of claim 3, further comprising:
   respective first and second pivots for each of the respective first and second portions.

5. The power tong of claim 1, further comprising:
   a flexible portion secured to one of the top fixed guard and the top movable guard, the flexible portion being operable to flexibly absorb shock produced by contact with the threaded members.

6. The power tong of claim 1, further comprising:
   a sensor to detect the position of the top movable guard; and
   a safety valve responsive to the sensor to prevent operation of the tong motor.

7. The power tong of claim 6, further comprising:
   a hydraulic pump;
   a four-way valve for controlling hydraulic fluid flow to the tong motor to control operation of the tong motor; and
   the safety valve including a three-way valve for blocking the flow of hydraulic fluid to the four-way valve in response to the sensor.

8. The power tong of claim 1, further comprising:
   a bottom fixed guard secured to the power tong frame, the bottom fixed guard substantially enclosing the bottom rotary plate.

9. The power tong of claim 1, further comprising:
   a bottom movable guard that is movable with respect to the power tong frame between an open and a closed position, the bottom movable guard enclosing the bottom pipe slot opening when in the closed position.

10. The power tong of claim 1, further comprising:
    a bottom movable guard portion fixably connected to the top movable guard portion, the top and bottom movable portions having a U-shaped configuration.

11. The power tong of claim 1, further comprising:
    a power tong door pivotally mounted to the power tong frame and separately movable between an open position and a closed position with respect to said movable guard.

12. The power tong apparatus for making and breaking connections between threaded members, comprising:
    a power tong frame having a throughbore for receiving the threaded members and an open throat for supplying and withdrawing the threaded members to and from the throughbore;

a rotary portion of the power tong movable with respect to the power tong frame, the rotary portion defining a pipe slot opening for supplying and withdrawing the threaded members to and from the throughbore, the rotary portion substantially surrounding the throughbore;

a tong motor operable for driving the rotary portion during the making and breaking of the connections;

a door for closing across the open throat of the power tong frame when the tong motor rotates the rotary portion;

a movable guard with respect to the power tong frame between an open and a closed position, the movable guard having first and second portions with each portion being movable with respect to the other and each portion being movable with respect to the power tong frame, the first and second portion of the movable guard enclosing the pipe slot opening while in the closed position and being operative while in the closed position to remain fixed with respect to the power tong frame during the making and breaking of the threaded members, and the movable guard exposing the pipe slot opening while in the open position; and a fixed guard secured to the power tong frame, the fixed guard substantially enclosing the rotary portion, the fixed guard having a front portion with an opening therein corresponding to the pipe slot opening and a rear portion opposite the throughbore from the pipe slot opening, the fixed guard being operative to remain fixed with respect to the power tong frame while the threaded members are supplied and withdrawn from the throughbore and while making and breaking the threaded connections.

13. The apparatus of claim 12, further comprising:

a flexible insert attached to one of the fixed guard and the movable guard.

14. The apparatus of claim 13, wherein:

the flexible insert is sized to correspond to the size of the threaded members.

15. The apparatus of claim 12, wherein:

each of the first and second portions of the movable guard are attached to the fixed guard.

16. The apparatus of claim 12, further comprising:

the door includes first and second power tong doors each pivotally mounted with respect to the power tong frame; and said first and second portions of said movable guard are carried by said first and second power tong doors, respectively.

17. The apparatus of claim 12, wherein at least one of the fixed guard and the movable guard contains a plurality of perforations.

18. A power tong for making and breaking connections between oilfield threaded members, comprising:

a power tong frame having a throughbore for receiving the threaded members and an open throat for supplying and withdrawing the threaded members to and from the throughbore;

a partial ring substantially surrounding the throughbore and rotatable within the power tong frame;

top and bottom rotary members each substantially surrounding the throughbore and rotatable with respect to the power tong frame in response to rotation of the partial ring, the top and bottom rotary members defining respective top and bottom pipe slot openings for laterally moving the power tong on and off the threaded members;

a tong motor operable for driving the partial ring during the making and breaking of the connections;

a door for closing across the open throat of the power tong frame when the tong motor rotates the rotary portion;

a top fixed guard secured to the power tong frame, the top fixed guard having a front portion with an opening therein corresponding to the top pipe slot opening and a rear portion opposite the throughbore from the front portion, the top fixed guard being fixed with respect to the power tong frame while the tong is moved on and off the threaded members and while making and breaking the threaded connections; and a top movable guard movable with respect to the power tong frame between an open and a closed position, the top movable guard enclosing substantially all of the top pipe slot opening while in the closed position and exposing the top pipe slot opening while in the open position for moving the tong laterally on and off the threaded members.

19. The power tong of claim 18, wherein the top movable guard further comprises:

first and second portions each separately movable with respect to the power tong frame.

20. The power tong of claim 18, further comprising:

a pivot connection positioned opposite the top pipe slot opening with respect to the throughbore in the power tong frame for pivotally connecting the top movable guard with respect to the power tong frame.

21. The power tong of claim 18, further comprising:

a bottom fixed guard secured to the power tong frame, the bottom fixed guard substantially enclosing the bottom rotary member.

22. The power tong of claim 21, further comprising:

a bottom movable guard movable with respect to both the power tong frame and the door.

23. The power tong apparatus as defined in claim 18, wherein the top movable guard has first and second portions each movable with respect to the other and each movable with respect to the power tong frame.

24. The power tong apparatus as defined in claim 18, wherein at least one of the top fixed guard and the top movable guard contains a plurality of perforations.

* * * * *